C. H. JOCKMUS.
WIND SHIELD CLAMP.
APPLICATION FILED DEC. 30, 1910.
1,015,386.
Patented Jan. 23, 1912.
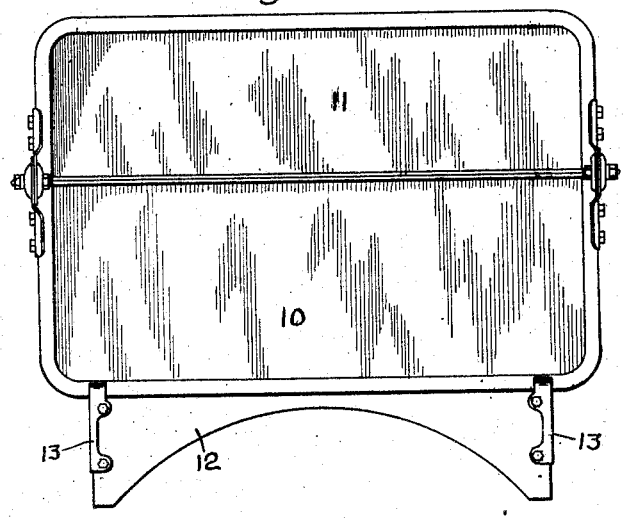
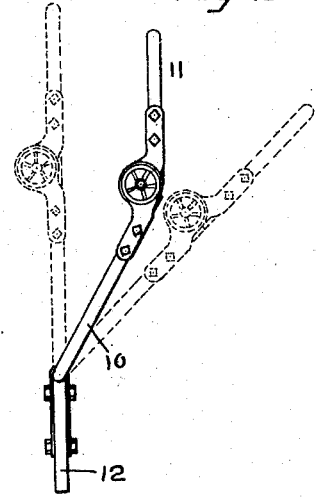
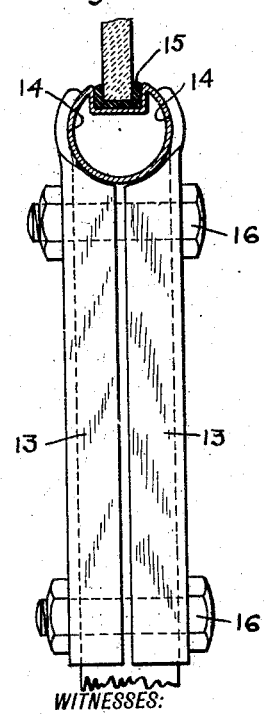
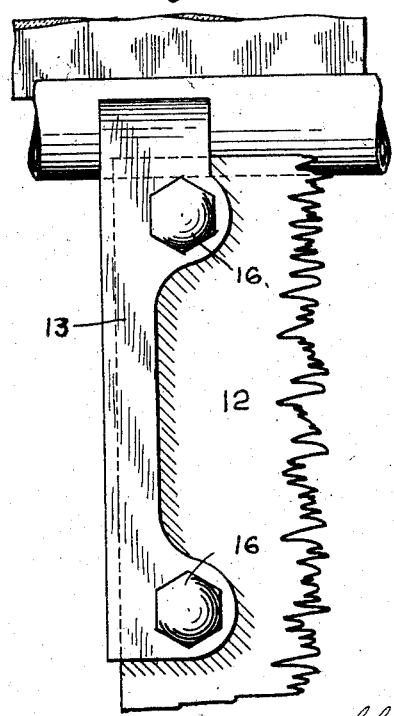
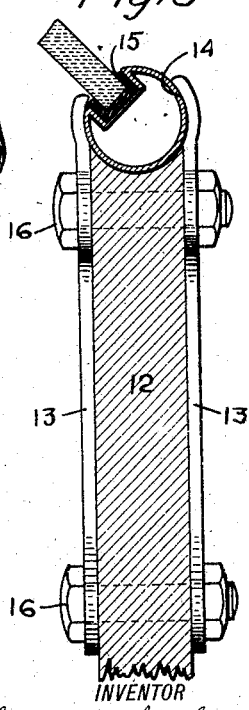

UNITED STATES PATENT OFFICE.

CHARLES H. JOCKMUS, OF ANSONIA, CONNECTICUT.

WIND-SHIELD CLAMP.

1,015,386. Specification of Letters Patent. Patented Jan. 23, 1912.

Application filed December 30, 1910. Serial No. 600,044.

*To all whom it may concern:*

Be it known that I, CHARLES H. JOCKMUS, a citizen of the United States, residing at Ansonia, county of New Haven, State of Connecticut, have invented an Improvement in Wind-Shield Clamps, of which the following is a specification.

This invention has for its object to produce a clamp especially adapted to secure wind shields to the filler-in boards of automobiles.

A further object of the invention is to provide a device of this character so constructed as to provide for variation in the size of the wind shield frame and also in the thickness of the filler-in board.

A further object of the invention is to provide a device of this character that will securely hold a wind shield with the lower member in the usual vertical position and is equally adapted to retain the lower member in a backwardly inclined position as in the so-called zigzag arrangement of a two-part wind shield.

With these ends in view I have devised the novel clamp for this special purpose, of which the following description in connection with the accompanying drawing is a specification, reference characters being used to indicate the several parts.

Figure 1 is a front elevation of a filler-in board with a two-part wind shield attached thereto by means of my novel clamps; Fig. 2 an end elevation as seen from the right in Fig. 1, illustrating in full and dotted lines different positions of the shield members; Fig. 3 a view on an enlarged scale, partly in elevation and partly in section, illustrating the manner in which my novel clamps grip a filler-in board and a wind shield frame; Fig. 4 an elevation as seen from the right in Fig. 3; and Fig. 5 is an elevation as seen from the right in Fig. 4, illustrating a slightly variant form, one arm of the clamp being made shorter than the other in order to permit the lower member of a wind shield to be set at a low angle backward.

10 denotes the lower member of a windshield, 11 the upper member and 12 the filler-in board. The upper and lower members of the shield are shown as secured together by novel hinges of my invention which form the subject of another application for Letters Patent of even date herewith.

My novel clamp comprises two corresponding members, each member consisting of an angle plate 13 adapted to engage the end and one side of the filler-in board and a curved socket 14 which with the corresponding socket upon the other clamp member partly incloses and closely engages the frame of the lower shield member.

It is of course well understood that wind shield frames are usually made of brass tubing, the tube for each side of the frame being provided with a groove or channel which receives a cushion 15 in which the edge of the glass is seated. The problem presented is to provide a clamp that may be rigidly and quickly secured to the filler-in board, and which will also grip and securely hold the tubular shield frame in any position in which it may be placed but which may be readily loosened sufficiently to permit the lower shield member to be adjusted and as quickly tightened up again, locking the lower shield member in the adjusted position. The shape of the angle plates and sockets is made to correspond with the ends of the filler-in boards and with the ordinary curvature of shield frames. The shape is such, however, that the clamps will grip the parts equally well even though there may be considerable variation in the thickness of the filler-in boards and in the size of the tubular frames of the wind shields. Each pair of clamp members is secured to the filler-in board and caused to lock the wind shield in place by means of bolts 16 which pass through the filler-in board and are provided with nuts at the threaded ends.

Where it is contemplated that a low angle of adjustment of the lower shield member may be required, I make one of the curved sockets in each pair of clamp members shorter than the other, as shown at the right in Fig. 5. This enables the lower shield member to be swung backward at as low an angle as may be required to suit a person of small stature; that is, it enables the lower shield member to be swung backward at a low enough angle so that the upper member may be placed in the vertical position and the joint between the members will be lowered wholly below the line of vision of the operator so as not to interfere in driving. To adjust the lower member at any time it is simply necessary to losen the nuts on the upped bolts of the clamps, swing the shield member to the required position and then tighten up the nuts again.

Having thus described my invention I claim:

The combination with a filler-in board having its top edge provided with a longitudinal transversely curved groove, and clamping members secured to opposite sides of said filler-in board in pairs, the upper end of each clamping member being provided with socket portions extending above said filler-in board and provided with internal faces curved on the same arc as the curvature of said groove, the outer edges of said members being provided with longitudinal flanges adapted to fit over the end of said filler-in board, in combination with a wind shield member having a rounded edge portion seated in said groove and mounted between said socket portions, whereby pivotal movement of said shield is permitted, the extremities of the opposite socket portions being separated by a space to permit pivotal adjustment of said wind shield member.

In testimony whereof I affix my signature in presence of two witnesses.

CHARLES H. JOCKMUS.

Witnesses:
 EDW. W. STEELE,
 FRED W. FISHER.